(12) United States Patent
Shimshoni

(10) Patent No.: US 7,487,186 B2
(45) Date of Patent: Feb. 3, 2009

(54) PROTOCOL AGNOSTIC DATABASE CHANGE TRACKING

(75) Inventor: Daniel S. Shimshoni, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 10/968,539

(22) Filed: Oct. 19, 2004

(65) Prior Publication Data

US 2006/0085485 A1   Apr. 20, 2006

(51) Int. Cl.
*G06F 12/00* (2006.01)
(52) U.S. Cl. .................... 707/201; 709/248; 707/10
(58) Field of Classification Search .............. 707/200, 707/201, 203, 10, 204; 709/248
See application file for complete search history.

(56) References Cited

U.S. PATENT DOCUMENTS

| | | | |
|---|---|---|---|
| 6,529,921 B1* | 3/2003 | Berkowitz et al. | 715/500.1 |
| 7,133,987 B2* | 11/2006 | Watanabe et al. | 711/162 |
| 7,139,748 B1* | 11/2006 | Mills et al. | 707/3 |
| 7,277,997 B2* | 10/2007 | Vincent | 711/162 |
| 2003/0158869 A1* | 8/2003 | Micka | 707/203 |
| 2003/0177321 A1* | 9/2003 | Watanabe | 711/161 |
| 2004/0024795 A1* | 2/2004 | Hind et al. | 707/204 |

\* cited by examiner

*Primary Examiner*—Hosain T Alam
*Assistant Examiner*—Amy Ng
(74) *Attorney, Agent, or Firm*—Lee & Hayes, PLLC

(57) ABSTRACT

An efficient mechanism is provided to track and collect changes that have occurred in a database since a given point in time in a manner that is accessible and usable to systems that implement synchronization protocols, has a minimal impact on the performance of the database, and allows the identification of small pieces of data as changed.

14 Claims, 6 Drawing Sheets

PROTOCOL AGNOSTIC DATABASE CHANGE TRACKING

FIELD OF THE INVENTION

The present invention is directed to databases, and more particularly, to tracking and collecting changes that have occurred in a database since a given point in time.

BACKGROUND OF THE INVENTION

Databases may reside in mobile devices, and often times the data stored in these databases is a replica of another database, stored in a less mobile location, such as a desktop computer or an enterprise data server. Because mobile devices are not always connected, they are typically synchronized with the other replicas on a periodic basis. Synchronization may be performed transactionally or using merge replication, for example. This exchange of information is commonly bi-directional: data is sent in and out of the databases. In order to minimize the time spent processing the data and sending it over the network, most synchronization protocols only send the changes since the last communication between the databases.

Because communication may be expensive in both monetary and performance terms, it is desirable to efficiently detect the changes that are to be sent.

SUMMARY OF THE INVENTION

The present invention is directed to an efficient mechanism to track and collect changes that have occurred in a database since a given point in time in a manner that is accessible and usable to systems that implement synchronization protocols, has a minimal impact on the performance of the database, and allows the identification of small pieces of data as changed.

Aspects of the invention include database change tracking systems and methods that provide for quickly and efficiently detecting changes and can be used interchangeably with various synchronization protocols.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Figure 1:
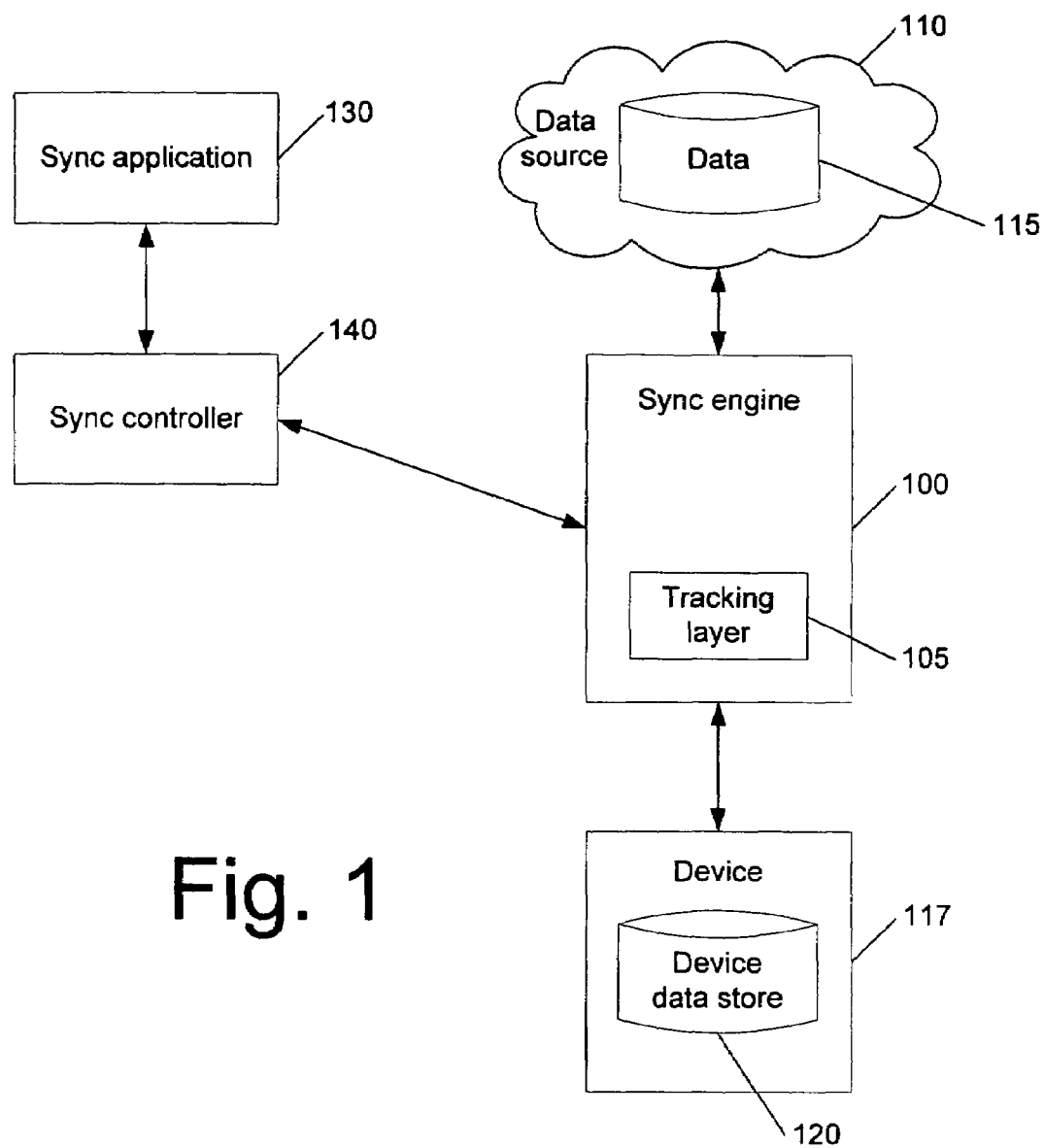
FIG. 1 is a block diagram of an exemplary system in accordance with the present invention.

FIG. 1 is a block diagram of an exemplary system in accordance with the present invention. Column-level tracking and change forwarding, described further herein, are desirably supported. Data is synced from a device data store 120 (residing on a device 117, such as a mobile device, for example) to a data store 115 at a data source 110 (such as a data server, for example) via a sync engine 100. A sync application 130 provides sync commands and instructions to a sync controller 140 which controls the sync engine 100. The sync engine 100 can send status information to the sync controller 140. This status information can also be provided to the sync application 130. An exemplary sync engine may be built into the database storage engine of the Microsoft SQL Server Mobile Edition database and is exposed internally through a COM-based API and externally through a Windows (C functions based) API, for example.

The sync engine 100 comprises a tracking layer 105. The tracking layer 105 is used to determine which items on the device 117 (i.e., in the device data store 120) should be sent to which sync partner. A sync partner may be considered to be a logical entity that a database would synchronize with (e.g., a server). Put another way, a sync partner is an entity that is interested in knowing about the changes in a given database. With respect to FIG. 1, a sync partner is a logical representation of a data source that the device data store 120 (which is, for example, a database) is synchronizing with. A sync partner typically represents a database server, and more particularly, a sync partner may represent a master copy or a replica the database is synchronized with.

Thus, as shown in FIG. 1, for example, the data source 110 and its data store 115 is the sync partner that the device data store 120 is syncing with. A data store, also referred to herein as a database, may have one or more sync partners. It is possible to forward changes from one sync partner to another through a database that is being tracked.

As used herein, a sync session is the time during which a database is synchronizing with a sync partner. Any sync operation, such as change collection or applying data downloaded from the sync partner, desirably takes place during a sync session. A sync session occurs on a per partner basis. There is desirably only one sync session active at a time per database. Changes to a database are desirably collected and applied within a sync session for a given sync partner.

As used herein, a generation is a logical timestamp that is local to a database. Because a computer's clock may be out-of-sync, a relative timestamp is used to provide an accurate mechanism to determine if an action has happened before, at the same time as, or after, another action. The relative timestamp is desirably represented as a counter. A database has a current generation at all times. Changes that occur in a database are marked with the current generation of the database. The generation value can desirably only be incremented. Typically, the generation changes at the start of a sync session.

An API may be provided to handle basic synchronization and change tracking in the database. Desirably, concurrent access to the database is provided, including during the synchronization. An exemplary change tracking system determines what items on the device should be sent to a sync partner (e.g., the server). In particular, change tracking desirably locates all the items that were added, modified, or deleted since the last sync, and excludes any changes that were applied by the sync partner.

Desirably, common information pertaining to tracking and synchronizing changes is schematized. According to an embodiment, the tracking layer 105 comprises system tables, including sysTrackedObjects, sysRowTrack, and DeletedRows. sysTrackedObjects holds information about various tracking related objects, such as sync partners, tracked tables, tracked columns, etc. sysRowTrack contains change information about rows and columns, and may only contain information about rows deleted from user tables. DeletedRows contains temporary information about deleted rows. This information is desirably merged into the sysRowTrack table upon beginning a sync session. In addition, each track table desirably comprises some or all of the system columns set forth in Table 1.

TABLE 1

| Column name | Type | Description |
| --- | --- | --- |
| _sysIG | Integer | The local generation at which the row has been inserted |
| _sysCG | Bigint | The generation of the change |
| _sysCD | Datetime | The time and date the change occurred |
| _sysP1 | Varbinary | Custom property |
| _sysMC | Varbinary | The bitmap of the changed columns |
| _sysMCS | Varbinary | The bitmap of the changed columns, saved for change forwarding between sync partners |
| _sysSR | Varbinary | Server reference |

Although more than one sync partner may concurrently track and replicate the same table, it is contemplated that only sync partners of the same type may use and share the server reference and custom property.

The tracking layer 105 supports column-level tracking. A bitmap is maintained in the tracking layer, and for example, represents the columns in the sysMC (Modified Columns) column. When a column is changed, the corresponding bit in the bitmap is set (e.g., changed from "0" to "1"). The tracking layer desirably provides an API to extract the information relating to a column changing.

Figure 2:
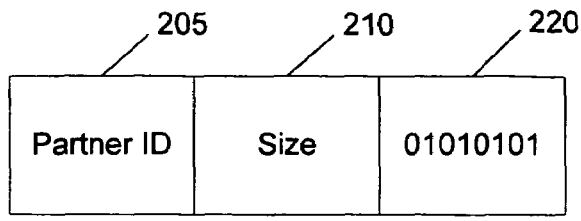
FIG. 2 is a diagram of an exemplary bitmap in accordance with the present invention.

FIG. 2 shows a diagram of an exemplary bitmap 200 in accordance with the present invention. Here, a field 205 desirably contains a partner ID and a field 210 desirably holds the size of the bitmap. A field 220 contains the bits pertaining to each column associated with the sync partner. The partner ID field 205 may be any type of identifier that can be used to identify a sync partner, and the size field 210 may contain any type of indicator or identifier that represents the size of the bitmap. The bits in field 220 are desirably set to either "0" or "1", which represents whether or not the associated column has been modified or not. These bits are subsequently used in synchronization with other sync partners. In the bitmap, if a column is 1, then it is changed; if a column is 0, then it is not changed. In other words, the dirty state of the columns is represented by individual bits in the bitmap. The value of 1 means the column is dirty, and 0 means the column has not been modified. Thus, differences are marked, and a change can be queried from any logical point in time.

Figure 3:
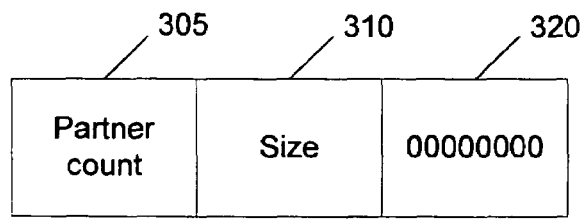
FIG. 3 is a diagram of an exemplary main bitmap in accordance with the present invention.

The format of an exemplary bitmap is Partner ID (FIG. 2)/Count (FIG. 3, described further below): 4 bytes; Size: 4 bytes; and bit field (Column bitmap): variable size, depending on the highest ordinal of modified columns in the row. The position of the bits, from left to right (high to low) corresponds to the ordinal of the column—e.g., column 0 is represented by the highest bit, column 1 by the second-to-highest bit, etc.

The in-database change tracking supports column-level tracking. Column-level tracking means that changes are tracked at the column level (i.e., at change collection). Thus, it can be determined which columns have been modified. Column-level tracking marks individual columns inside the rows as changed.

Column-level tracking is performed per sync partner, which typically will save a lot of traffic and transport. A change is desirably noted if it is specific to a sync partner. According to an embodiment, two bitmaps are used: a "main" bitmap and a "saved" bitmap. The main bitmap is the common bitmap used for change tracking and change collection, and the saved bitmap is a bitmap used for change collection.

Generally, column-level tracking only applies to updates, because inserts and deletes typically apply to an entire row. In order to keep track of the changed columns, the tracking layer desirably maintains a bitmap representing modified columns.

Not all situations warrant a bitmap as described above. For example, a "clean" row (i.e., a row which has no modified column) does not need to represent the size and partner ID. In such cases, a few exemplary pre-defined values, holding only one byte, are defined as follows. For a clean row in which no column is modified: 0×80; for a dirty row in which the row is modified and the column is non-deterministic, such as the case of inserted rows: 0×81; and if all columns are dirty: 0×82. The left-most bit of the first byte desirably indicates that the bitmap has a predefined value and only contains one byte.

The tracking layer 105 supports change forwarding. The use of generations (described further below) provides a general indication pertaining to change collection and change application during a sync session. Change forwarding also desirably uses column-level tracking techniques in order to clear and forward change indications between sync partners.

A main bitmap and a saved bitmap are desirably used in change forwarding. A main bitmap 300 is used to record changes in the row, and has a format such as that shown in the exemplary bitmap of FIG. 3. The main bitmap has a partner count field 305, a size field 310, and a bit field 320. The count field 305 is used to identify the number of sync partners that are participating in syncing. The size field 310 is similar to the size field 210 as described above. The bit field 320 in a main bitmap stores bits representing new column modifications of a particular row. Thus, the main bitmap is used to record changes in the row.

The bit field 320 of the main bitmap 300 is cleared if there is only one sync partner, and that sync partner has received the changes. If there is more than one sync partner (as determined by the partner count field 305, for example), then a copy of the main bitmap is made for each sync partner, with an ID associated with the sync partner. These copies are saved as a "saved" bitmap 400.

Figure 4:
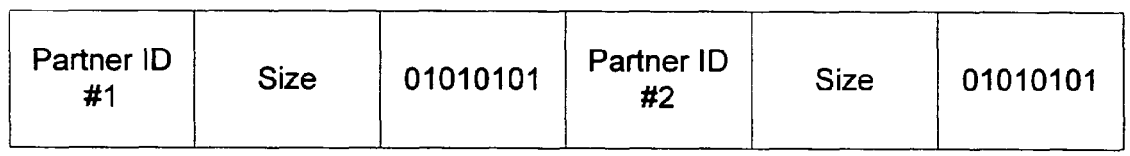
FIG. 4 is a diagram of an exemplary saved bitmap in accordance with the present invention.

There may be optimizations to reduce the amount of data a bitmap has for each sync partner. Moreover, in order to save space and increase performance, specific information pertaining to different sync partners is desirably not stored in the main bitmap. Instead, its contents are copied into a so-called saved bitmap. An exemplary saved bitmap 400 is shown in FIG. 4. The saved bitmap 400 desirably has the same structure as the main bitmap 300, but is specific to a sync partner, so that for a first partner, for example partner 1, the size and bits pertaining to that partner is stored, along with the size and bits pertaining to additional partners (e.g., partner 2). A saved bitmap is desirably only created when the main bitmap is cleared by a different sync partner.

Thus, a main bitmap 300 is provided, along with a saved bitmap 400 which comprises copies of the main bitmap for other sync partners that are made after the main bitmap is saved. A sync partner subsequently combines the two bitmaps to determine any dirty states.

Figure 5:
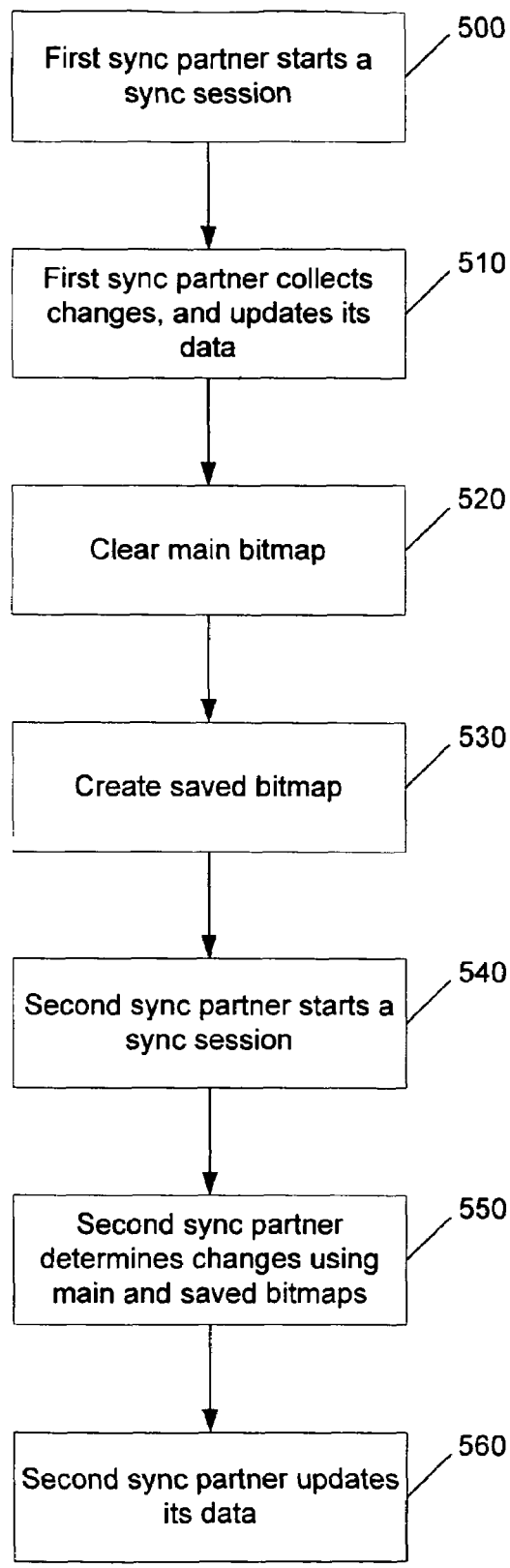
FIG. 5 is a flow diagram of an exemplary method of syncing in accordance with the present invention.

FIG. 5 is a flow diagram of an exemplary method of syncing in accordance with the present invention, and will be described with respect to an example. Assume a database has two sync partners, A and B, and assume column X has changed in table T. At step 500, a first sync partner (e.g., sync partner A) starts a sync session, and, at step 510, collects the changes in table T. At step 520, the main bitmap of the row that has changed is cleared.

At step 530, a saved bitmap is created for the other sync partner(s) (e.g., sync partner B). A second sync partner (e.g., partner B) starts a sync session at step 540, and then determines at step 550 whether the row has changed, desirably by combining the main bitmap (now clear) and the saved bitmap that was created pursuant to sync partner A clearing the row. Because column X was marked and changed and saved in the saved bitmap for sync partner B, the row will return as changed, and sync partner B will then be able to determine which columns have been modified and update its data accordingly, at step 560.

A sync partner that "clears" a row does not need to keep a saved copy of the bitmaps as it is no longer interested in the old modifications, only in new ones, saved in the main bitmap. Thus, the maximum number of bitmaps per row is N, where N is the number of sync partners "interested" in the table.

When a sync partner clears the column bitmap, the row is considered to be unchanged, and will not be collected again by that sync partner, unless further changes occur later. However, if more than one sync partner tracks the table, a copy of the bitmap will be created when the columns are cleared. The saved bitmap may be stored in the sysMCS (Modified Columns—Saved) column, for example. The bitmap will be visible (via the saved bitmap) to the other sync partners who will be able to collect the changes, regardless of the fact the columns (in the main bitmap) have been cleared by another sync partner.

During synchronization, the server may compare a list with a snapshot of items on the device since the last sync and determine what items were added, changed, and/or deleted. The server may then ask the device for the items that were added and/or changed.

Figure 6:
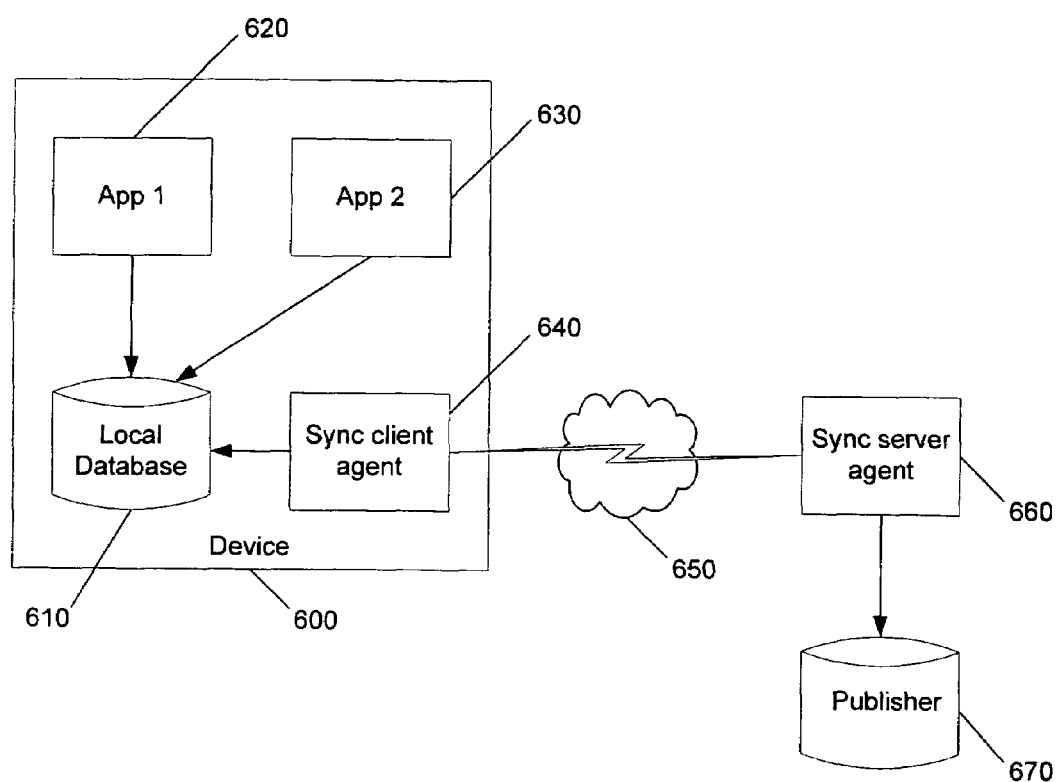
FIG. 6 is a block diagram of another exemplary system in accordance with the present invention.

FIG. 6 is a block diagram of another exemplary system in accordance with the present invention. Client applications 620, 630 and the sync partners (e.g., a server which uses a sync server agent 660 and stores data in a publisher 670, and the device 600 itself) use a database 610 concurrently. The database 610 is associated with a device 600 on which various applications 620, 630 may be run. The sync server agent 660 communicates through a network 650, for example, with the sync client agent 640, which provides appropriate access to the database 610. In this architecture, the syncing is non-obtrusive. While the sync is in process, the user is not prevented from continuing running database-based applications 620, 630.

Figure 7:
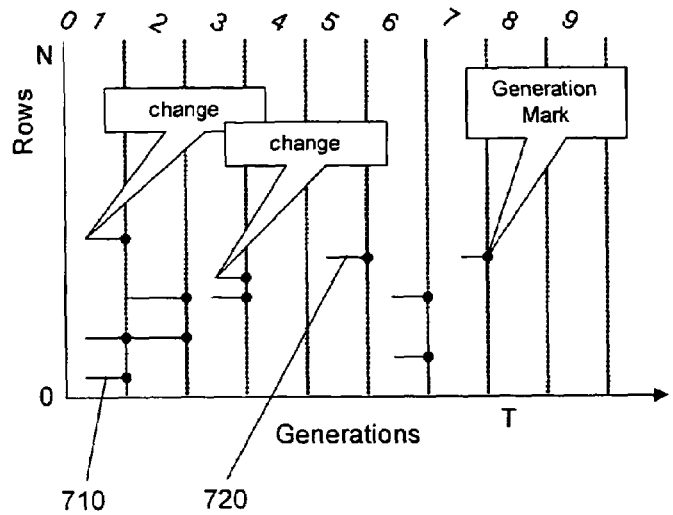
FIGS. 7 and 8 show diagrams that are helpful in describing aspects of the present invention.
Figure 8:
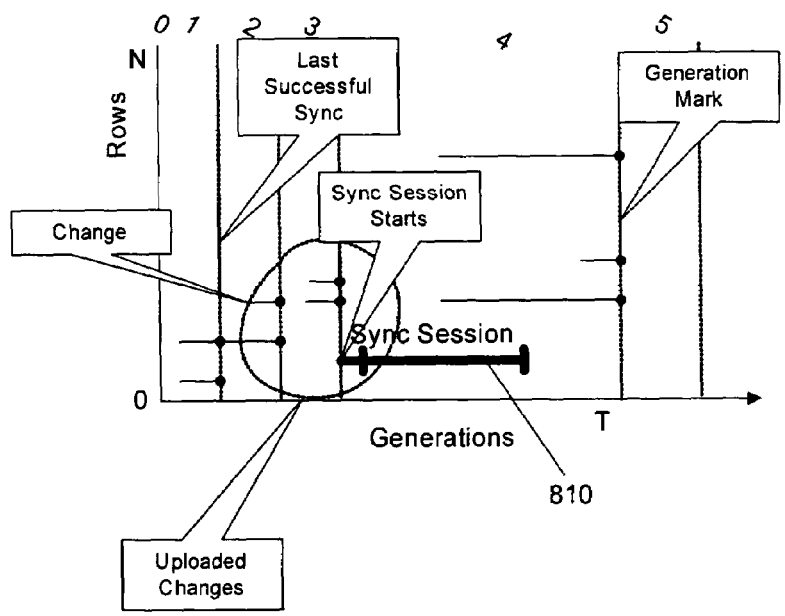

FIGS. 7 and 8 show diagrams that are helpful in describing aspects of the present invention. These figures show the tracking of changes in various rows using generations. Horizontal lines, such as lines 710, 720, represent changes. Changes desirably mark the rows with the current generation value. For example, change 710 occurs between generation 0 and generation 1, and is thus desirably assigned a logical time of 1 (i.e., a logical time associated with generation 1). Similarly, change 720 occurs between generation 5 and generation 6 and will be assigned to a logical time of 6 (i.e., a logical time associated with generation 6).

Turning to FIG. 8, a sync session (e.g., sync session 810) marks the beginning of a new generation. The sync agent uploads rows marked with generations that fall inside a range that depends on the last successful sync with the publisher.

When a sync session occurs, it desirably has two times: one time that only belongs to it, and one time that belongs to everyone else. When a sync session is started, the global time (the generation) is bumped twice. Thus, there can be one time that belongs to the sync session, and one time that belongs to the local changes. So with multiple users, changes can be applied without interference. When changes are being applied, a logical timestamp is generated. A new contact is done after the original changes in the current sync session are applied. Logically, the new contact is applied later.

Because the tracking information is stored in the table itself, no additional locking functionality is required from the tracking layer, as any write privileges are handled by the data manipulation action that is recorded.

It is contemplated that the invention is protocol agnostic in that aspects of it can be used with any type protocol.

Exemplary Computing Environment

Figure 9:
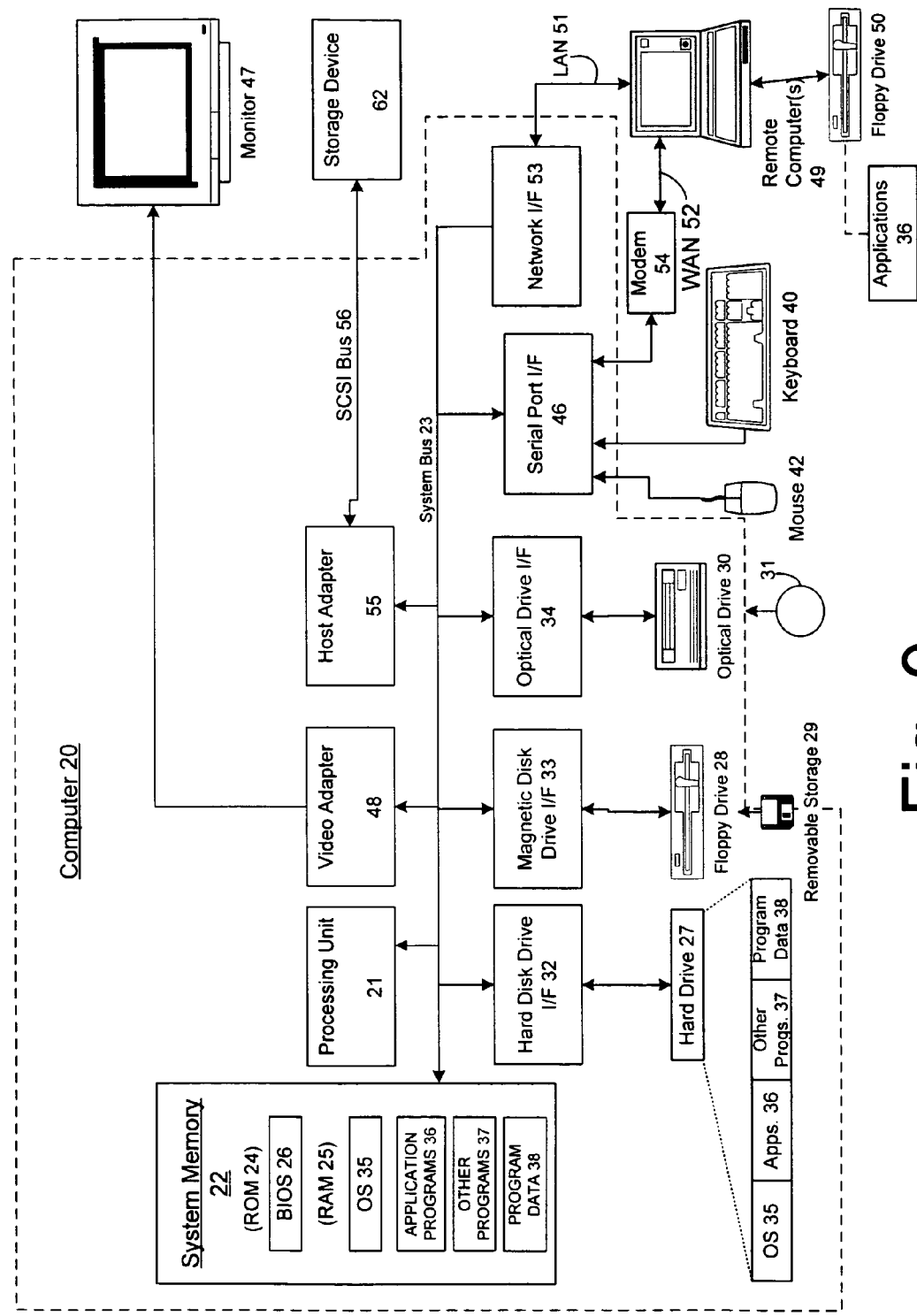
FIG. 9 is a block diagram representing a computer system in which aspects of the present invention may be incorporated.

Numerous embodiments of the present invention may execute on a computer. FIG. 9 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types.

Those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 9, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 9 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 9. The logical connections depicted in FIG. 9 include a local area network (LAN) 51 and a wide area network (WAN) 52. Such networking environments are commonplace in offices, enterprise wide computer networks, intranets and the internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A computer-implemented method for syncing data from a device to a plurality of sync devices on a per device basis, the device and the plurality of sync devices each having a data store for storing data, the device having multiple bitmaps facilitating syncing the data from the device to the plurality of sync devices, the method comprising:

starting a first sync session for syncing data from the device to a first sync device;

updating, based on a first bitmap stored in the device, data stored in the first sync device with the corresponding data stored in the device, the first bitmap comprising information indicative of change of the data when the data in the device is modified;

creating a second bitmap in the device by preserving the information stored in the first bitmap in the second bitmap;

clearing the first bitmap in the device after the first sync session is completed;

starting a second sync session for syncing the data from the device to a second sync device, wherein:

at least some of the data in the device has been modified before the second sync session; and the information in the first bitmap is updated to indicate data change when the data in the device are modified;

determining changes to data to be updated in the second sync device based on a combination of the updated first bitmap and the second bitmap, wherein the combination comprises:

information from the second bitmap indicative of data change before the first sync session is performed; and information from the first bitmap indicative of data change during a time period from the first sync session to the second sync session; and updating data in the second sync device based on the determined changes.

2. The method of claim 1, wherein the first bitmap is a main bitmap and the second bitmap is a saved bitmap.

3. The method of claim 1, wherein creating the second bitmap comprises storing a copy of the first bitmap for at least one sync device.

4. The method of claim 3, wherein storing the copy of the first bitmap comprises storing a field identifying the sync device the copy is associated with.

5. The method of claim 1, further comprising generating the first bitmap, prior to modifying data associated with the first sync device based on the first bitmap, by storing a plurality of bits, each bit associated with a column in a row and the value of each bit indicating the state of the associated column.

6. The method of claim 5, wherein the first bitmap further comprises a device count field that identifies the number of sync device.

7. The method of claim 1, further comprising incrementing a generation associated with the first sync device after starting the sync session for the first sync device.

8. A computer-readable storage medium having stored thereon computer-executable instructions for performing a method of syncing data from a device to a plurality of sync devices on a per device basis, the instructions, when executed on a computing device, causing the computing device to perform a method, the method comprising:

starting a first sync session for syncing data from the device to a first sync device;

updating, based on a first bitmap stored in the device, data stored in the first sync device with the corresponding data stored in the device, the first bitmap comprising information indicative of change of the data when the data in the device is modified;

creating a second bitmap in the device by preserving the information stored in the first bitmap in the second bitmap;

clearing the first bitmap in the device after the first sync session is completed;

starting a second sync session for syncing the data from the device to a second sync device, wherein:

at least some of the data in the first device have been modified before the second sync session; and the information in the first bitmap is updated to indicate data change when the data in the first device are modified;

determining changes to data to be updated in the second sync device based on a combination of the first bitmap and the second bitmap, wherein the combination comprises:

information from the second bitmap indicative of data change before the first sync session is performed; and information from the first bitmap indicative of data change during a time period from the first sync session to the second sync session; and updating data in the second sync device based on the determined changes.

9. The computer-readable storage medium of claim 8, wherein the first bitmap is a main bitmap and the second bitmap is a saved bitmap.

10. The computer-readable storage medium of claim 8, wherein creating the second bitmap comprises computer-executable instructions for storing a copy of the first bitmap for at least one sync device.

11. The computer-readable storage medium of claim 10, wherein storing the copy of the first bitmap comprises computer-executable instructions for storing a field identifying the sync device the copy is associated with.

12. The computer-readable storage medium of claim 8, wherein the method further comprises generating the first bitmap, prior to modifying data associated with the first sync device based on the first bitmap, by storing a plurality of bits, each bit associated with a column in a row and the value of each bit indicating the state of the associated column.

13. The computer-readable storage medium of claim 12, wherein the first bitmap further comprises a device count field that identifies the number of sync devices.

14. The computer-readable storage medium of claim 8, wherein the method further comprises incrementing a generation associated with the first sync device after starting the sync session for the first sync device.

* * * * *